Patented Sept. 5, 1939

2,171,976

UNITED STATES PATENT OFFICE 2,171,976

PROCESS OF MANUFACTURING STABILIZED DIAZO SALTS

Wallace A. Erickson, Woodstown, N. J., assignor to E. I. du Pont de Nemours & Company, Wilmington, Del., a corporation of Delaware No Drawing. Application June 3, 1937, Serial No. 146,289

4 Claims. (Cl. 23—250)

This invention relates to the manufacture of stabilized diazo-salts, and especially to improvements in the processes of manufacturing such salts.

In the dyeing of textile fabrics with azo dyes it is customary to impregnate the goods with an azo dye coupling component and then to apply a diazo-salt over all or that part of the goods which is to be dyed, thereby forming the insoluble azo dye on the fibre. For example, one practice of the kind comprises printing on the impregnated goods with a printing paste which contains the diazo-salt. For practical reasons the diazo-salt used in these pastes is prepared in a form which will not readily deteriorate in ordinary atmospheric conditions in which it is stored and handled, but when it is properly combined by the printer with other ingredients in a printing paste and printed on the impregnated goods, it will combine with the coupling component. The latter treatment is generally called development.

The non-deteriorating form of diazo-salt which can be handled in ordinary atmospheric conditions is a composition in the form of a virtually dry powder which contains a diazo-salt complex. In order to obtain the diazo salt in solid form, a complex which will precipitate from the diazo solution is formed. The diazo-salt complex is commonly made by adding to the diazo solution of the diazotized amine an agent such as zinc chloride or naphthalene-1:5-disulphonic acid which precipitates the diazo-salt complex. The diazo-salt complex is filtered off giving a damp paste. After suction filtering, centrifuging or the like, the residual adherent water is taken care of by mixing the damp paste with a non-deleterious water-absorbing agent which takes up the water and is capable of producing with the diazo-salt a virtually dry powder which has stability in ordinary atmospheric conditions. Partially dehydrated aluminum sulphate, such as that corresponding to the formula

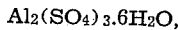

$Al_2(SO_4)_3.6H_2O$, partially dehydrated alums and sodium sulphate have been used for this purpose. But, the drying of the paste or disposition of adherent water is accompanied with many difficulties because the process of water absorption is an exothermic reaction, and the adherent water cannot be entirely removed by filtering means, much heat is developed by the hydration of the dehydrating agent and the diazo-salt complex is a highly unstable compound when heated and in the presence of free water. Some of the compounds are highly inflammable, others will detonate and all of them will decompose rapidly upon heating.

Water miscible liquids, such as alcohols which can be volatilized at low temperatures are generally solvents for the salts and the diazo salts are as a general rule reduced by the alcohols. On the other hand most all liquids which do not dissolve or react with the diazo salts are not sufficiently volatile at low temperatures or they are not miscible with water. Consequently costly, laborious and hazardous methods of drying the diazo salt complexes have been employed in the past.

Heretofore the drying of the paste has been done in a mixing machine, such as a ball mill, rod mill or graining bowl by charging the mixing machine with a batch of the dehydrating agent and then adding the water containing paste of diazo-salt complex slowly and in small portions whilst agitating and mixing the materials. While the mixing device could be cooled or not as desired, this operation was slow and laborious at best because of poor heat conductivity from the mixture of solids the solid walls of the containers. Moreover the control and the long duration of the batch operation was costly, laborious and favorable to the deterioration of the diazo-salt, and the process was generally hazardous because of the large amount of water to be taken up and the consequent liability of overheating which would produce destructive results.

It is an object of this invention to provide improvements in the processes of preparing stabilzed diazo-salts. Another object of the invention is to provide new processes of removing adherent water from stabilized diazo-salt complexes. Another object of the invention is to provide processes which improve the quality of the products over the products produced by prior art methods. Another object of the invention is to provide safer, and more easily controlled methods for drying diazo-salt pastes. Still other objects of the invention will be apparent from the following description.

The objects of the invention are attained generally by mixing or washing a paste of diazo-salt complex containing adherent water with acetone so as to enable the formation of a solution of acetone with the water and acetone-soluble impurities of the paste and then removing the acetone solution as by mechanical means such as by suction filtration or centrifuging. While the acetone-treated material contains a small amount of water as adherent water-acetone solution, the quantity of adherent water is found to be reduced by this treatment to an extremely small quantity. The water is reduced to such a small amount that if it is subsequently mixed with inorganic dehydration agents, the mixing is accompanied with but little exothermic action, the control of the final drying process is facilitated and the decomposition of the diazo compound is minimized.

The invention is explained more in detail by aid of the following examples which illustrate the invention but the invention is not limited thereto. In the examples quantities are given in parts by weight.

*Example 1*

84 parts of ice were mixed with 18 parts of concentrated sulfuric acid, and 11.8 parts of finely ground para-nitro-ortho-anisidine slowly added to the mixture. After agitating for fifteen minutes 16.4 parts of 30% sodium nitrite solution were slowly added. Agitation was continued for one-half hour after the last of the nitrite has been added and the solution then clarified. 22 parts of sodium chloride were dissolved in the clear diazo solution and 9.7 parts of 50% zinc chloride slowly added with good agitation. After the last of the zinc chloride solution had been added the agitation was continued for one hour to complete the precipitation. The resulting slurry was then pumped into a filter press and the precipitate was blown for a few minutes to remove the most of the adhering mother liquor. 20 parts of acetone were then pumped into the press or until acetone flowed freely from the spigots. The pump was stopped and the acetone was permitted to penetrate into the cake diazo-salt. The press was then blown to free the product from the acetone and the charge was dumped from the press. The charge was dehydrated by adding it in small portions to a quantity of partially dehydrated aluminum sulfate which was sufficient to effect the dehydration, and ground. After grinding, the powder was diluted to the desired strength by mixing the powder with the desired amount of dehydrated aluminum sulphate in an acid-proof ball mill.

It was found that in the dehydration there was less heating, less liability of decomposition of the diazo-salt and less danger of ignition or detonation than with mixtures which had not been treated with acetone. By comparison with powders which had not been treated with acetone the product was found to have been freed of tar matter which dulls the shade of the dyes. There was no reduction of the diazo salt as far as could be ascertained and no material loss by dissolution.

*Example 2*

5 parts of concentrated hydrochloric acid were poured on 20 parts of ice, and 2.5 parts of meta-chloraniline slowly added with good agitation. 1.4 parts of dry sodium nitrite then were sprinkled into the mixture slowly, and the agitation continued for one-half hour after all the nitrite had been added. The temperature of the solution at this point was very close to 0° C. The solution was clarified and salted with 6.3 parts of sodium chloride. When all the salt had been dissolved, 4.9 parts of naphthalene 1:5-disodium-sulfonate (67% strength) were added gradually with good agitation and the mixture stirred for one hour to insure complete precipitation. The resulting slurry was run onto a circular suction filter and the product drained as well as possible from the mother liquor. The vacuum was shut off and 4 parts of acetone were poured on the cake of precipitate.

Enough solid carbon dioxide had been added previously to the acetone to reduce the temperature to below 10° C. The dissolved carbon dioxide was gradually liberated over the product in the suction filter thus reducing the fire hazard.

The acetone was permitted to soak into the cake for about fifteen minutes, penetration being aided by breaking up the product with a wooden shovel. The vacuum was applied and the product sucked as dry as possible. As the product dried its temperature dropped by reason of the evaporation of acetone. After one-half hour the product, at a temperature of about 0° C., was removed from the suction filter and mixed with partially dehydrated aluminum sulfate. The product was then ground in an acid-proof rod mill fitted so that a slight vacuum was applied to remove the residual acetone.

Besides the improvements noted in Example 1 it was found that the use of the acetone-carbon dioxide mixture further reduced the hazard of decomposition.

*Example 3*

14.8 parts of concentrated sulfuric acid were poured upon 70 parts of ice and 10 parts of finely ground para-chlor-ortho-nitro-aniline slowly sifted into the agitated mixture. After agitating for fifteen minutes, 13.5 parts of a 30% solution of sodium nitrite were run in slowly to effect the diazotization of the amine. The solution was agitated for one hour after the last of the nitrite was added. At this point the solution turned starch-iodide paper blue and had a temperature below 5° C. The solution was clarified and salted with sodium chloride as in Examples I and II. When the salt was dissolved 4 parts of zinc chloride, in an equal amount of water, were added slowly with rapid agitation. After all the zinc chloride had been added the mixture was stirred for one hour to complete the precipitation. The slurry of diazo-salt was run into a filter press and blown to remove most of the adhering liquid. The product was dumped from the press and transferred to an enamel-lined kettle fitted with an agitator. 20 parts of acetone were added and the diazo-salt thoroughly mixed with the acetone for about fifteen minutes. This slurry was again run into the filter press and blown to remove the acetone. The product was removed from the press, mixed with partially dehydrated aluminum sulfate and finally charged into a ball mill to complete the drying, mixing and dilution.

The improved processes of the invention may be applied to any of the usual stabilized diazo-salts. Such products are prepared from a wide range of desirable arylamines, among which the following may be mentioned:

Ortho-chloro-aniline
Meta-chloro-aniline
4-nitro-2-amino-toluene
4-nitro-2-amino-anisole
5-nitro-2-amino-anisole
4-chloro-2-amino-toluene
5-chloro-2-amino-toluene
3-nitro-4-amino-anisole
Alpha-naphthylamine
Ortho-phenetole-azo-alpha-naphthylamine
4-benzoyl-amino-2:5-diethoxy-aniline
4:4'-diamino-diphenylamine
Dianisidine
4-amino-4'-ethoxy-diphenylamine The various steps in the process of diazotization and stabilization are subject to considerable variation. For example the diazotization of the arylamine may be carried out under various conditions of temperature, acidity, volume and selection of acid which conditions will be selected readily by those skilled in the azo color art. The precipitating and stabilizing agents may be selected from the large number described in the prior art. By far the most important agents, however, are zinc chloride and naphthalene-1:5-disulfonic-acid.

When the acetone treated complex is mixed with other dehydrating agents and afterwards standardized, numerous drying and standardizing agents may be used. One of the most important agents for both purposes is partially dehydrated aluminum sulfate, and dehydration to approximately $Al2(SO_4)3.6H_2O$ or $Al2(SO_4)3.9H_2O$ is desirable. However, the partially dehydrated alums, particularly potassium alum are suitable agents. Likewise, anhydrous sodium sulfate and other drying agents occasionally may be used either alone or in combination with the agents stated above.

The methods of filtering the paste diazo-salt may be varied according to the physical nature of the materials. In general, good results are obtained by the use of suction filtration.

The washing with acetone can be effected in various ways. Most conveniently the paste diazo-salt is filtered on a suction filter, and the cake washed with acetone on the same filter. Usually it is advisable to "soak" the cake with the acetone, while the vacuum is shut off. "Puddling" of the cake with the acetone facilitates the washing. After the cake is thoroughly wet with the acetone, suction is again applied. However, it will be understood that these operations can be carried out also in a filter press, on rotary filters, in centrifuges and still other forms of filters. Likewise, it is apparent that the cake may be removed from the filter, stirred with the solvent, and the slurry re-filtered.

The final dehydration in admixture with a non-deleterious dehydration agent may be carried out in various known forms of apparatus, such as ball mills, rod mills and graining bowls with agitation of the charge of dehydrating agent with gradual addition of the acetone-treated complex to the charge. With suitable apparatus the final dehydration, grinding and standardization can be done in the same apparatus, for example in a ball mill. An excellent method of carrying out the final dehydration comprises gradually feeding both the complex and the dehydrating agent continuously into a cooled tubular device which is provided with means to prevent agglomeration of the materials and means to rapidly transfer the heat of hydration to a cooling medium. By this method the dehydration with inorganic salts can be carried out continuously, rapidly and economically. The grinding and standardization of the mixture is done thereafter in other devices.

It has been discovered that acetone has little, if any effect on the diazo salt complex except to remove admixed water and tarry impurities. Hence the proportions of acetone to diazo-salt complex can be widely varied depending primarily on the water and tar matter content of the diazo-salt complex. Instead of one application of acetone a plurality of applications may be made if desired. For the best results at least sufficient acetone is used to dissolve the adherent water, but more can be used. The final traces of adherent acetone are preferably removed after the mixture is ground by applying a vacuum to the mixture at ordinary atmospheric temperatures, but the vacuum treatment can be applied at any time after the major portion of acetone is removed.

Still other modifications of the invention will be suggested to those skilled in the art without departing from the spirit and scope of the invention and it is to be understood that no limitations are intended in the annexed claims except those which are specifically recited or are imposed by the prior art.

I claim:

1. The process of preparing a stabilized composition of a diazo-salt complex which comprises forming a diazo-salt complex by adding to an acid aqueous solution of a diazo-salt an agent capable of precipitating from said solution a stable addition product of said diazo-salt, forming a moist paste by removing from the precipitate the major part of the resulting aqueous solution, dissolving tarry substance and the moisture of said paste by adding an excess of acetone to the paste, removing the major part of the dissolved material by separating the acetone solution until a second paste is formed, and then separating a residue of water and acetone from said second paste.

2. The process of preparing a stabilized composition of a diazo-salt complex which comprises forming a diazo-salt complex by adding to an acid aqueous solution of a diazo-salt an agent capable of precipitating from said solution a stable addition product of said diazo-salt, forming a moist paste by removing from the precipitate the major part of the resulting aqueous solution, mixing the paste with an excess of a solution of carbon dioxide in acetone to dissolve moisture and adventitious material, removing the major part of the solution of dissolved material until a second paste is formed, and then separating a residue of water and acetone from said second paste.

3. The process of preparing a stabilized composition of a diazo-salt complex which comprises forming a diazo-salt complex by adding to an acid aqueous solution of a diazo-salt an agent capable of precipitating from said solution a stable addition product of said diazo-salt, forming a moist paste by removing from the precipitate the major part of the resulting aqueous solution, soaking the paste with acetone to dissolve acetone-soluble materials therein, removing the major portion of the acetone solution from the soaked paste, and then separating a residue of water and acetone from the resulting paste.

4. The process of preparing a stabilized composition of a diazo-salt complex which comprises forming a diazo-salt complex by adding to an acid aqueous solution of a diazo-salt an agent capable of precipitating from said solution a stable addition product of said diazo-salt, forming a moist paste by removing from the precipitate the major part of the resulting aqueous solution, dissolving tarry substance and the moisture of said paste by adding an excess of acetone to the paste, removing the major part of the dissolved material by separating the acetone solution until a second paste is formed, mixing said second paste with a solid dehydrating agent, and then applying a vacuum to the resulting mixture until a residue of adherent acetone is evaporated.

WALLACE A. ERICKSON.

CERTIFICATE OF CORRECTION.

Patent No. 2,171,976. September 5, 1939.

WALLACE A. ERICKSON.

It is hereby certified that error appears in the printed specification of the above numbered patent requiring correction as follows: Page 1, second column, line 24, after the word "solids" insert to; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.